United States Patent

[11] 3,568,866

[72] Inventor Glenn Black
 1007 Wilson St., Bay City, Mich. 48706
[21] Appl. No. 770,263
[22] Filed Oct. 24, 1968
[45] Patented Mar. 9, 1971

[54] TOWABLE TRAILER COMBINATION
 10 Claims, 15 Drawing Figs.
[52] U.S. Cl.................................................. 214/500,
 214/517, 214/85.5, 280/408
[51] Int. Cl....................................................... B60p 3/10,
 B60p 3/40
[50] Field of Search........................................ 214/500,
 512, 515, 517, 44, 85.5; 280/414; 298/8

[56] References Cited
 UNITED STATES PATENTS
3,103,288  9/1963  Pruss............................ 214/44
3,120,408  2/1964  Pruss............................ 214/501X
3,212,655  10/1965 Pruss............................ 298/8X
3,348,859  10/1967 Melbye.......................... 280/414X Primary Examiner—Albert J. Makay
Attorney—Edward E. Schilling ABSTRACT: A smaller two-wheeled trailer is mounted behind and suspended from a larger two-wheeled trailer, with the wheels of the smaller slightly above ground level, in easily and controllably disconnectable combination. The smaller trailer has the tongue removed and ordinarily stowed out of the way for subsequent separate use of the trailer. Short rigid support members extend forwardly from the smaller trailer and are attached to the back of the larger trailer so as to be pivotal in at least the vertical plane while attached. Flexible support means extend down and back from upstanding support members on the larger trailer to attaching means on the smaller trailer. Taking in the flexible support means or moving the upper end of the upstanding support means forward raises the smaller trailer off the ground, in which position it becomes legally transportable in combination with the larger trailer which is preferably provided with a longitudinally slidably adjustable axle assembly.

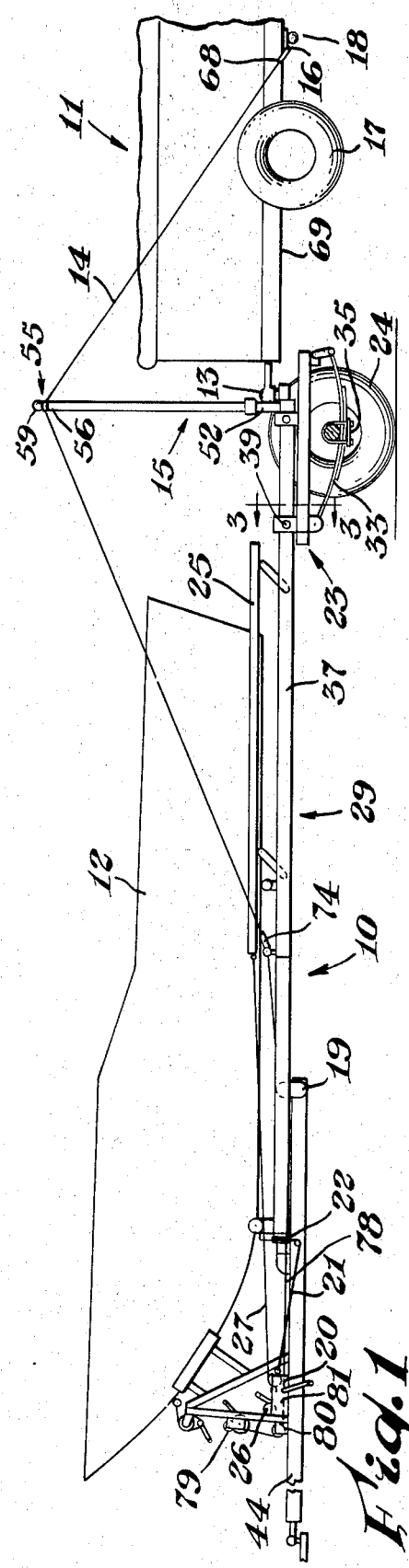

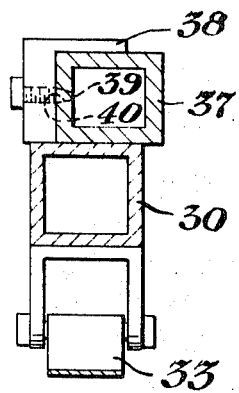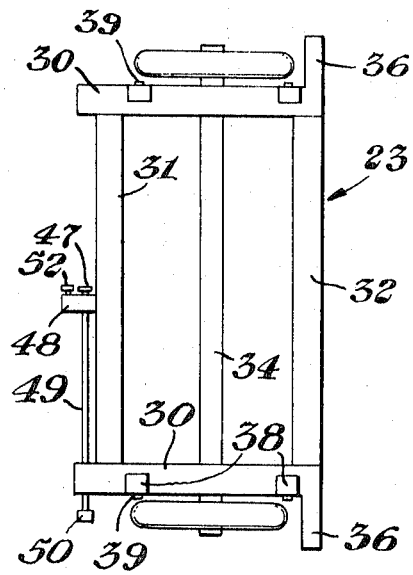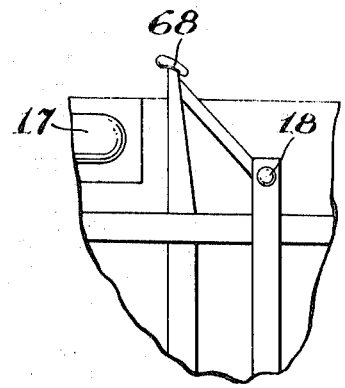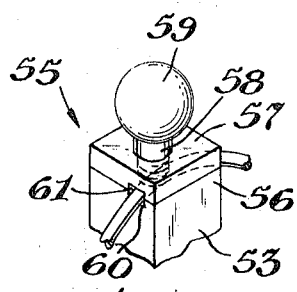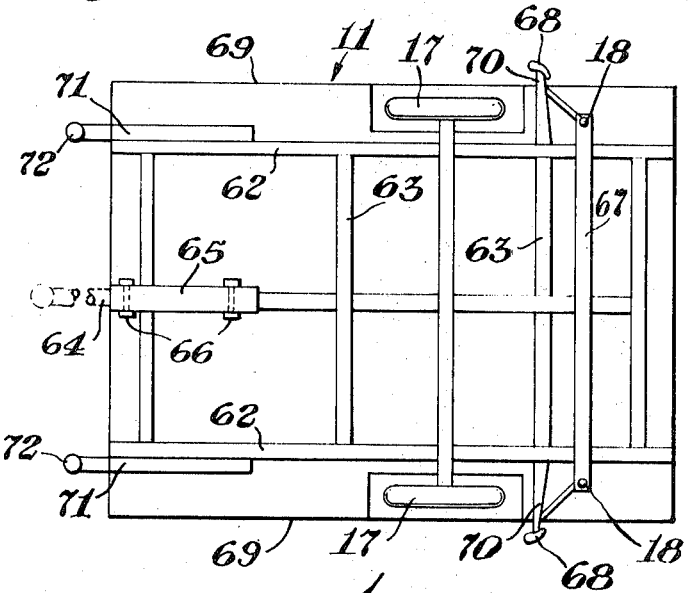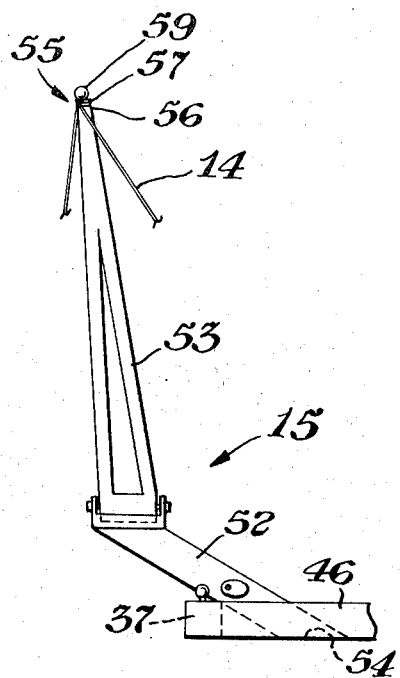

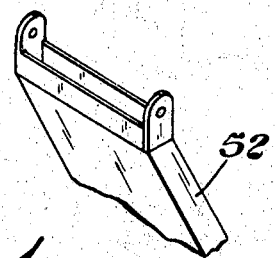
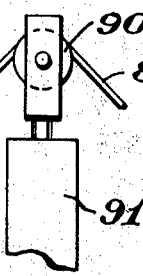
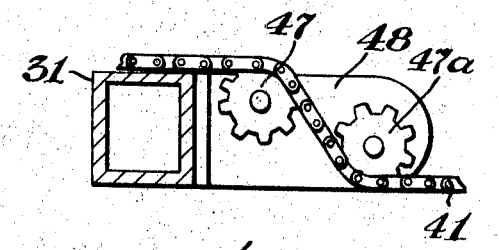
Fig. 8  Fig. 9  Fig. 10
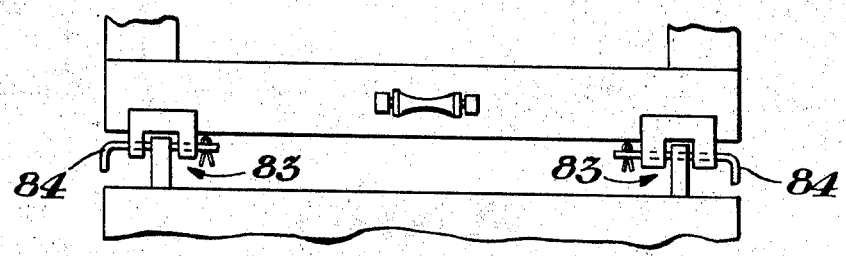
Fig. 11
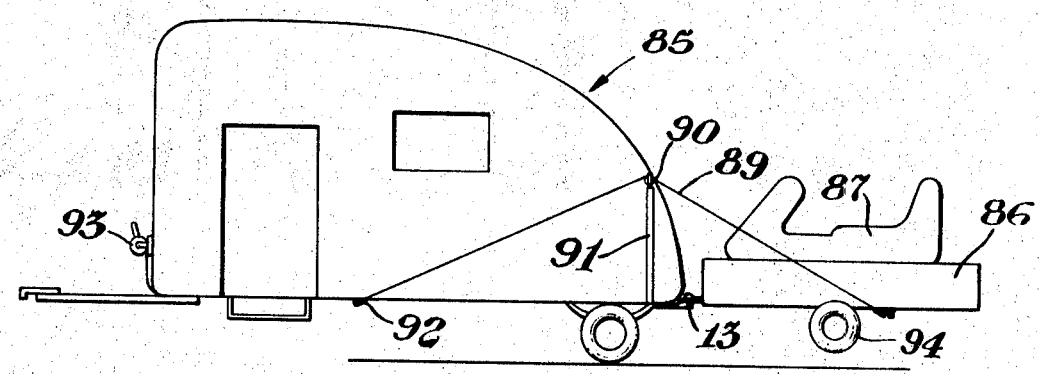
Fig. 12
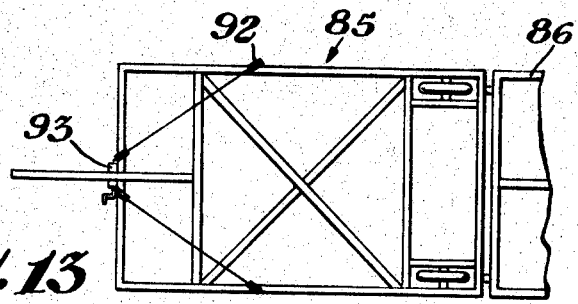
Fig. 13
INVENTOR.
Glenn Black
BY
Edward E. Schilling
ATTORNEY

TOWABLE TRAILER COMBINATION

BACKGROUND OF THE INVENTION

1. Field of the Invention

The invention relates to a combination of a smaller two-wheeled trailer and a larger two-wheeled trailer adapted to carry the smaller trailer and to the combination of parts by which the smaller trailer is lifted off the ground and is held suspended, whereby the smaller trailer is legally transportable with the other trailer.

For the purposes of the following description and the appended claims, the term trailer refers to vehicles with a single axle as well as vehicles with a plurality of axles in tandem, i.e., none of the wheels being steerable independently of its axle, such trailers being intended for use at regular highway speeds as an appendage to an automobile or pickup truck, and the term two-wheeled trailer is intended to embrace both single axle vehicles with two wheels and tandem-wheeled vehicles, whether the latter are provided with a single axle or a plurality of axles.

2. Description of the Prior Art

With the steady growth of leisure time, more and more interest has been generated in both water and winter sports. Enthusiasts now desire the means to enjoy such sports, not only during occasional annual or midyear vacations, but during frequent weekends in the appropriate seasons. To keep down living expenses, and also, in many cases, to facilitate recreation in the more remote scenic areas, it is now desirable to be able to drive to the outdoor sports area while towing both shelter and the means to enjoy the sport. In the summer, a desirable combination is a boat and boat trailer plus a camper trailer. In the winter, a good combination is a house trailer plus a trailer suitable for hauling a snowmobile.

In some states, it is illegal to pull two or more trailers in tandem behind an automobile or pickup truck. In such states the tandem combination of U.S. Pat. No. 3,348,859 is not permitted on the highway. Since most people find it is not feasible to carry one of these trailers on top of the other, they have had to resort to using two autos to tow two trailers, or they have had to make two trips to transport two trailers with one auto, or they have had to do without one trailer and rent the desired item at their recreational destination.

OBJECTS OF THE INVENTION

A principal object of the invention is to provide a legally acceptable means for transporting two trailers such as a boat trailer and a camper trailer behind an automobile or pickup truck.

Another object of the invention is to provide, in easily and controllably disconnectable combination, a larger two-wheeled trailer having a smaller two-wheeled trailer mounted therebehind and suspended therefrom with the wheels of the smaller trailer normally held at least slightly above ground level.

Yet another object of the invention is to provide a combination of a larger two-wheeled trailer and a smaller two-wheeled trailer in which the smaller is carried behind the larger with the wheels of the smaller off the ground, which combination is readily hitched together or unhitched, and each trailer is readily and satisfactorily used apart from the combination.

Still a further object of the invention is to provide a trailer combination of the class described herein in which means is provided for substantially balancing the larger trailer when being used in the combination, or apart.

These and other objects and advantages of the combination of trailers of the present invention will be better understood by those skilled in the art upon becoming familiar with the following description and the appended drawings.

SUMMARY OF THE INVENTION

The objects of the invention are met by a combination of a larger two-wheeled trailer with a smaller two-wheeled trailer in which combination the smaller trailer is mounted behind and suspended from the larger trailer with the wheels of the smaller at least slightly above ground level, normally. The tongue of the smaller trailer is removed and is ordinarily stowed, e.g., under the smaller trailer, and two or more rigid connecting means extending forward from the smaller trailer pivotally engage connecting or fastening means on the back of the larger trailer. Flexible support means extending downwardly and back from upstanding support means on the larger trailer are connected, tautly, to fastening means on the smaller trailer. On taking in the cable at the smaller trailer as with a winch, but more preferably, on moving the upper end of the upstanding support means forwardly, the smaller trailer is lifted sufficiently that the wheels thereof are raised above ground level. Preferably, the larger trailer is provided with an axle that is adjustably slidable in the front to back direction so that the load on the trailer can be balanced over the axle whether the trailer is being used alone or in combination.

DETAILED DESCRIPTION OF THE INVENTION

The trailer combination of the invention will be better understood with reference to the accompanying drawings in which like reference numerals refer to like parts and in which:

FIG. 1 is a view in side elevation of a trailer combination according to the invention in which the larger trailer is a boat trailer with a boat thereon, the smaller trailer is a camper trailer, and the boat trailer is provided with a slidably adjustable axle;

FIG. 2 is a plan view of the boat trailer of FIG. 1 with the boat removed and with the padded stabilizing supports for the boat hull omitted from the view;

FIG. 3 is a view in section along line 3-3 of FIG. 1, showing the nature of the clamps used to lock the slidably adjustable axle in place;

FIG. 4 is a plan view of the entire slidable axle assembly, including the rectangular frame from which the axle per se depends, and which frame adjustably slides past adjacent frame portions of the boat trailer;

FIG. 5 is a bottom plan view of the camper trailer of FIG. 1, showing the appearance of the trailer from the underside;

FIG. 6 is an enlarged fragmentary view of a portion of the view of FIG. 5 showing some of the details of the flexible support guide and fastening means;

FIG. 7 is a fragmentary view, slightly enlarged, of the left rear portion of the boat trailer, as viewed from behind the trailer, showing some of the details of assembly and construction of the upstanding support means for the flexible cable;

FIG. 8 is a fragmentary view in perspective of the upstanding support means of FIG. 7 with the pivotal portion removed;

FIG. 9 is a fragmentary view of the upper portion of a non-pivoting upstanding support means suitable for use on a house trailer, such as that illustrated in FIG. 12, showing the cable passing through a pulley on the upper end of said upper portion instead of being attached to a pivotal member as in FIG. 1, 2, and 7;

FIG. 10 is a view in section, taken along line 10-10 of FIG. 2, illustrating the sprocket means for moving the adjustably slidable axle, and a sprocket chain engaged therewith;

FIG. 11 is a fragmentary view of the back part of the larger or boat trailer hooked up to the front part of the smaller or camper trailer similar to that of FIG. 1, but showing another form of pivotal connection between the trailers that is pivotal in a fixed plane;

FIG. 12 is a view in side elevation of a trailer combination according to the invention in which the larger trailer is a house trailer and the smaller trailer is a utility trailer carrying a snowmobile;

FIG. 13 is a bottom plan view of the house trailer of FIG. 12 and a fragmentary portion of the utility trailer attached thereto and mounted thereon;

FIG. 14 is an enlarged fragmentary perspective view of the upper end portion of the upstanding support member of FIG. 7, showing the details of the cable clamp thereon; and FIG. 15 is a fragmentary view in side elevation of a suspended camper trailer, such as trailer 11 shown in FIG. 1, showing an additional embodiment of the trailer combination of the invention in which the winch and cable means for raising and lowering the smaller suspendable trailer is mounted on such smaller trailer.

Referring to FIG. 1, the trailer combination presented by way of illustration is seen to consist of a boat trailer, indicated generally by the numeral 10, and a camper trailer, indicated generally by the numeral 11. A boat 12 is carried on the boat trailer 10 in a normal manner. The camper trailer 11 is shorter than the boat trailer and is carried therebehind, being supported slightly off the ground by means of dual pivotal connecting means 13, such as a standard ball hitch at each side of the trailers, and flexible support means 14, usually in the form of a single flexible metal cable, clamped at respective intermediate points to both upstanding support means 15, or arms, on the boat trailer 10, and attached at each end 16 to connecting means 18, usually posts, mounted on the camper trailer 11, generally on the underside thereof and behind the wheels 17 thereof.

The boat trailer 10 shown is a typical trailer with hinged connection 19 between the tongue and frame, and winch 20, a cable 21 and a pulley 22 in combination constituting means for controllably jackknifing the trailer frame vertically intermediate the ends to facilitate unloading and loading the boat 12 from and onto the trailer 10, though the present invention is equally applicable to a trailer not equipped with such a hinged assembly.

The larger trailer in the combination, here the boat trailer 10, is preferably equipped with a slidably adjustable axle assembly, indicated generally by the numeral 23, so that the substantial change in weight distribution on adding or removing the smaller trailer may be compensated and the load balanced with respect to the wheels 24 of the larger trailer upon moving the axle assembly 23 appropriately and locking it in the adjusted position.

The boat trailer 10 is shown in plan in FIG. 2 with the boat 12 removed and with the hinged, padded, stabilizing boat hull supports 25 of FIG. 1 and the winch 26 and cable 27, which serve as activating means therefor, omitted to simplify the view, such supports being desirable, but not essential, to the operation of the present trailers.

The adjustable slidable axle assembly will be better understood with reference to FIGS. 2, 3 and 4. The assembly 23, as seen in FIG. 4, is substantially a separate entity from the trailer frame 29, and may be made by welding together appropriate lengths of structural material, e.g., heavy-duty square steel tubing or channel iron, to form a rectangle with side members 30, a front transverse member 31 and a back transverse member 32. Leaf springs 33 are mounted below either side member 30 and the axle 34 is attached to each spring with shackles 35, as more clearly seen in FIG. 1, though any other suitable axle mount may be used. If desired, fenders (not shown) for the wheels may be attached to side members 30. Side extensions 36 of the back transverse member 32 are conveniently provided, if desired, for mounting brake lights and auto vehicle license tags.

The axle frame assembly 23 is slidably attached to the boat trailer frame 29 and slides thereunder with side members 30 of the assembly 23 substantially aligned with side members 37 of the boat trailer. Each side member 30 is held to a superposed side member 37 by means of two or more clips 38 that are welded or otherwise attached to such side members 30, and extend up beside side members 37 and transversely across the top thereof. The clips 38 are locked in a fixed position by turning threaded bolts 39 through tapped holes extending through the clips until the ends of the bolts 39 extend into prespaced holes 40 extending through the sides of side members 37 of the boat trailer frame 29. Such clips 38 and bolts 39 together with the holes 40 in the trailer frame serve as indexing means in positioning the axle assembly.

The axle assembly is moved relative to the rest of the boat trailer in any suitable manner while the bolts 39 are backed out of the holes 40, a convenient provision being illustrated in FIGS. 2 and 10. A length of sprocket chain 41 extends with a little bit of slack from a sturdy mounting 42 on the rearward end 43 of the boat trailer tongue 44 to a mounting 45 on the rear transverse member 46 of the trailer frame 29 about midway between the sides thereof, and engages a drive sprocket 47 journaled in a bracket 48 mounted on the front face of front transverse frame member 31 about midway between the sides 37 of the trailer frame. The drive sprocket is mounted on one end of a rotatable shaft 49. The shaft 49 is journaled in and extends through a side member 30 of the axle assembly frame where it terminates in a socket 50 that is adapted to be operatively engaged by a crank handle 51. An idler sprocket 47a is positioned a little lower than the drive sprocket 47 on the bracket 48 and the sprocket chain is passed over the drive sprocket 47 and under idler sprocket 47a so as to maintain assured good engagement between the sprocket chain and the drive sprocket. On rotating crank handle 51 in either direction while the bolts 29 are backed off, the axle assembly 23 is "walked" along the sprocket chain 41 correspondingly in a readily controllable convenient manner. After moving the assembly to a preselected desired position where the bolts 39 line up with a pair of the holes 40, the bolts 39 can be advanced thereinto to lock the axle assembly in the new position.

In general, a boat trailer will be balanced with the axle assembly positioned substantially forward of the rear of the trailer frame. The combination of trailers will balance with the axle assembly moved well back of the balance point for the boat trailer alone, e.g., adjacent the back of the boat trailer, as shown.

The means for lifting and supporting the smaller trailer 11 will be better understood with reference to FIGS. 1, 2 and 7. At each side of the rear transverse member 46 of the boat trailer frame 29 there is mounted an upstanding support member 15 having a laterally inclined, upwardly extending, rigid base portion 52 and an elongated, upwardly extending portion 53 pivotally mounted on the base portion 52 so as to be pivotal about an axis transverse to the trailer frame 29 and through an arc of about 45° to 60°, the arc being approximately centered at the vertical direction. The length of the arc is not critical, so long as there is sufficient movement to permit lifting the smaller trailer, as will be explained hereinafter. The base portion 52, as shown, is mounted on a support plate 54 and may conveniently rest against side member 37 of the trailer frame. The support plate 54 is a rectangular plate fitted snugly into the intersection of the side member 37 and the transverse member 46 and is attached to such members along two of its sides as by welding. If it is not necessary to space the supports 15 apart, e.g., to permit passage of a boat therebetween, base portion 52 need not extend laterally, but may be simply upright. The pivotal portion 53 may be made in any sturdy form, e.g., in the form of an elongated triangle as here illustrated, The cable 14 that serves as the flexible support means that extends downwardly and back from the boat trailer and its upstanding support members 15 is attached to the top end portion of such support member, in both cases, by an appropriate clamp, for example, the clamp 55 illustrated in FIG. 14. The clamp 55 consists of the upper end portion 56 of the pivotal portion 53 which may be round, or rectangular, but generally is square and planar and has a centrally formed tapped hole extending thereinto or therethrough, an unattached upper jaw member 57 having the general form of a thick square or round washer with a perimeter having the same general outline as the end face of the pivotal portion 53, and a centrally formed hole bored transversely therethrough in the short dimension, and a threaded bolt 58, having a ball 59 integrally formed or attached on one end thereof, that serves as both a retainer and a handle. The cable 14 is placed between the upper jaw member 57 and the upper end portion 56 of pivotal portion 53 and the bolt 58 is tightened to hold the cable firmly. If desired, the bolt with a ball-shaped end may be replaced by a bolt with a conventional head, or more preferably by a bolt with a wing nut-shaped head. Preferably a groove 60 is formed across the end face of the pivotal portion 53, from front to back and offset from the centrally located bolt hole, with the floor of the groove arcuately shaped with the shallowest part of the groove midway the edges of the end face and the deepest parts at the edges, to prevent sharply bending the cable drawn thereover. The preferred upper jaw member 57 has a complementarily shaped and aligned groove 61, with the deepest portion of this groove in the middle and the shallowest portions at the edges.

When the trailers are connected, the cable 14, at each side, extends down to the trailer behind, e.g., the camper trailer 11 of FIG. 1, to a point usually behind the trailer wheels 17, and an end loop at each side of the trailer is slipped over a post 18, generally a post with an enlarged end, e.g., a ball shaped end, as may be seen in FIGS. 1, 5 and 6.

The camper trailer 11, shown as viewed from the underside in FIG. 5, typically has a rectangular frame with side sills 62 and transverse members 63 connecting the side sills. The trailer 11 readily used in the combination of the invention is provided with an easily removable tongue 64. The tongue shown slips out of a sleeve 65 in which it is ordinarily held by intersecting bolts 66, and is preferably stowed about the trailer, e.g., transversely to the underside of the frame with any suitable fastening means.

The fastening posts 18 for the cable ends 16 are suitably attached to a transverse frame member 67 that is positioned behind the wheels 17. Although it is not essential, it is preferred that guides 68 are employed which hold and direct the cable 14 about the lower lateral sides 69 of the trailer 11 so that the cable is not frayed nor the trailer marred. The guides 68, shown in FIGS. 5 and 6, are each small rounded metal blocks with a groove with an arcuate floor formed therein around the convex rounded surface, the blocks each being mounted on an outward side extension 70 of a transverse frame member 63 located behind the wheels 17 and in front of the transverse member 67 that holds the cable fastening posts 18. The guides 68 are each positioned so that the groove thereon is angularly aligned off the horizontal direction to match the angle of the cable 14.

A pair of symmetrically spaced apart arms 71, i.e., short rigid support members, extending forwardly from the front of the camper trailer, generally well spaced out towards the sides of the trailer, carry the socket portions 72 of the ball hitches 13. The socket portions 72 when engaged with equally spaced and aligned ball-like posts 73 on the back of the boat trailer 10, serve as pivotal connecting means 13.

In connecting the two trailers 10 and 11 together, the boat trailer 10 is backed up to the camper trailer, if possible, or if not, the camper is brought up to the back of the boat trailer in any possible, for example, by manual power. If the slidable axle assembly 23 has not been moved to the back of the boat trailer 10 for balance, this adjustment is now made and the assembly locked in place. The camper trailer 11 is then brought close enough to the boat trailer to connect at least one of the pivotal connectors or ball hitches 13. The other is then readily connected, or if necessary, after backing the boat trailer slightly with the powered towing vehicle (not shown). The camper trailer 11 will then normally sit canted somewhat upwardly at the front end. The looped ends 16 of the cable 14 are then directed directly back from the support members 15 to the camper trailer 11 and over the respective guides 68 and are each looped over and around a post 18 on the underside of the camper trailer 11 and drawn up to fit snugly around the smaller part of the post.

The cable 14 that serves as flexible support means for the camper trailer 11, as may be seen in FIGS. 1 and 2 taken together, is a single length, i.e., one piece, of cable that extends from one upstanding support means 15 through a small pulley 74 to a generally U-shaped bracket 75 holding a block 76, passing through the bracket 75, then back to a second small pulley 77 and back to the other upstanding support member 15. Individual lengths of cable could be used between the bracket 75 and each respective upstanding support member 15, but a single length is preferred. With a single length, if the cable should be broken while the trailer combination is being towed, e.g., on the highway, then both sides of the camper trailer 11 are let down simultaneously. If two separate pieces of cable are used and just one piece breaks, then one side of the camper trailer will drag on the highway while the other side is still being supported, and considerable warping or twisting stress will be placed upon the camper trailer and the back of the boat trailer frame. If the camper trailer is let down evenly upon both wheels, it should simply run on its own wheels until lifted up again after repairing the cable.

The camper trailer 11 is lifted off the ground, once the ball hitches 13 are connected, by moving the cable 14 forward in any suitable manner, for example, by means of a winch. The cable 14 should be clamped in clamps 55 atop upstanding support members 15 at an appropriate length from the posts 18 on the underside of the camper trailer so that the cable tightens promptly when the entire cable is pulled forward, and before upstanding support members 15 have moved appreciably through the arc through which such support members are movable. The support members 15 should be substantially vertical when the camper frame is substantially horizontal. On further moving the cable 14, under these circumstances, the upstanding support members are moved up and forward and exert a lifting force on the back part of the camper trailer 11. It is generally enough to lift the wheels 17 of the camper trailer 11 about 3 to 10 inches off the ground level. If the combination is towed over a major bump, then the camper trailer 11 can bounce on its own wheels and avoid placing the entire strain on the cable 14.

In the apparatus shown in FIG. 2, the cable 14 is moved forwardly with considerable ease, on account of mechanical advantage, upon winding the short connecting cable 78 upon a winch 79 located near the front of the assembly. The connecting cable 78 runs over a little pulley 80 and thence back through the winch-holding superstructure 81 on top of the tongue 44, thence to block 76, and plurally between block 76 and block 82 as a double tackle assembly. The block 82 is firmly held by a suitable coupling to the tongue 44, while the block 76 is held by bracket 75 which is not attached to anything else but cable 14.

The camper trailer 11 is readily disconnected upon backing off the winch 79, allowing the cable 14 to slacken and permit the upstanding support members 15 to pivot back and slightly down, thus lowering the back part of the camper trailer so that the wheels 17 thereof touch the ground and relieve the cable 14 of all tension. The loops at the ends 16 of the cable 14 can then be slipped off the posts 18 on the underside of the camper trailer. Then on disconnecting the two ball hitches 13, the two trailers are completely separated.

The pivotal connecting means connecting the short rigid support members 71 to the back transverse member 46 of the boat trailer need not take the form of ball joints, although the universal motion afforded by a single ball joint, just fastened, and while the other is being fastened, has proved to be most helpful to manual moving of the camper trailer. Another suitable form of connector, as shown in FIG. 11, uses a hinge-type connector 83, with a removable pin 84, in each case, extending through aligned holes through the hinge assembly. The hinge action about a horizontal axis is essential for lifting the camper trailer up into suspended position for transport according to the invention.

Referring to FIG. 15, there is seen another arrangement of the winch and cable means for raising and lowering the rear, smaller trailer 11, such as the trailer of FIG. 1. In this arrangement, upstanding supports, which must be understood to be on the larger trailer, such as supports 15 of FIG. 1, are held substantially immovable in an upright position and cable 14, on each side of the trailer 11 is brought down to and over a pulley 95 held by a bracket 96 near the rear of the trailer and at the lower edge 69 of the side of the trailer. The cable 14 extends from the pulley 95 to a clamp 98 under the trailer. A portion of cable 14 here identified by the reference numeral 97 extends to the opposite side of the trailer away from the viewer and is to be understood to be directed up the other side over a pulley similar to pulley 95 and up to one of said upstanding supports on the larger trailer. The cable clamp 98 is attached to a pulley 99 which is rigged as a double tackle assembly with winch 100 and flexibly connected thereto by cable 101. Winch 100 is mounted preferably on the underside of the trailer 11 about midway the lateral sides and adjacent the front with the winch positioned so that the crank has sufficient clearance to be rotated full circle.

Another trailer combination, transportable according to the invention, is illustrated in FIGS. 12 and 13. A house trailer, indicated generally by the numeral 85, is shown carrying a utility trailer 86 with a snowmobile 87 supported thereon. The utility trailer 86 is attached to the house trailer 85 by two ball hitches 13 in the same manner, that the camper trailer, described hereinabove, is attached to the boat trailer. The utility trailer is suspended with its wheels 94 slightly off the ground by means of the flexible cable 89. The cable 89 is provided in duplicate lengths, one at each side of the trailers. Each length extends from a fastening post (not shown) on the underside of the utility trailer 86, up through a pulley 90 mounted at the upper end of rigid upstanding support means 91, down through a guide pulley 92, and thence to a winch 93 at the front of the house trailer 85. Wince 93 is adapted to wind up both cable lengths 89 simultaneously. An enlarged detail of the upper end of rigid upstanding support member 91 and the pulley 90 thereon, is shown in FIG. 9. If desired pivotal upstanding support members may be used instead of the rigid ones and in that case it will be preferred to clamp the cables to the tops of the support members, and more preferably, to use a single length of cable. Preferably the house trailer is also provided with a slidably adjustable axle assembly as described above in connection with the boat trailer.

With respect to the foregoing description it is to be understood that, in general, guides with smooth slots, grooves or boreholes formed thereon or therethrough may be used in place of pulleys and vice versa. It is also to be understood that the present invention is applicable to substantially any trailer combination in which the front or carrying trailer is substantially the heavier of the two trailers. Generally, it is best if the front trailer is the longer, so that the inclined angle between the cable and the upstanding support member is greater to the front of the support member than to the back where the cable extends down to the suspended trailer. The steeper angle at the back permits a better lifting action on the smaller trailer.

I claim:

1. In easily and controllably disconnectable combination, a larger two-wheeled trailer and a smaller two-wheeled trailer, the larger trailer having the smaller trailer mounted therebehind and suspended therefrom (1) by a plurality of connecting members spaced apart and rigidly mounted at the front of said smaller trailer at either side of the longitudinal center line thereof, said connecting members extending rigidly forward from said smaller trailer and being adapted to pivotally engage connecting means adjacent the back of the larger trailer, and (2) by flexible support means that extends downwardly and back from respective upstanding support means at each side of the larger trailer to flexible support attaching means mounted on the smaller trailer; said smaller trailer having an axle, the wheels of said smaller trailer being mounted on said axle and rotatable on a fixed axis of rotation relative to said axle; and the wheels of the smaller trailer being held above ground level.

2. The combination of trailers as in claim 1 in which the connecting means adjacent the back of the larger trailer are each an attached ball, and the rigidly forwardly extending connecting members are sockets adapted to each align with and lockingly engage one of said balls.

3. The combination of trailers as in claim 1 in which the flexible support means is a length of cable with each end thereof terminated in a closed loop and the cable attaching means are each a post with an enlarged free end, each post being located adjacent a respective side of the smaller trailer and being attached and extending downwardly from a frame member of the trailer back of the axle thereof, and in each case, the loop being at least large enough to slip over the enlarged end of the post.

4. The combination of trailers as in claim 1 in which the larger trailer is provided with a frame and the upstanding support means at each side of the trailer is mounted adjacent the rear of the trailer frame and extends outwardly and upwardly therefrom.

5. The combination of trailers as in claim 4 in which the upstanding support means are each comprised of a shorter, outwardly inclined and upwardly extending base member and a longer and upwardly extending member, the longer member being pivotally supported by the shorter base member and the pivotal motion of the longer member being limited to a relatively short arc in substantially the longitudinal direction of the larger trailer.

6. The combination of trailers as in claim 1 in which winch and cable means are provided on the larger trailer and are adapted to cooperate with the upstanding support means in lifting and supporting or lowering the smaller trailer.

7. The combination of trailers as in claim 1 in which winch means are provided on the smaller trailer and the winch means are adapted to take up or let out, controllably, the flexible support means between the upstanding support means and the flexible support attaching means on the smaller trailer, thereby lifting and supporting, or lowering, the smaller trailer.

8. The combination of trailers as in claim 1 in which the larger trailer is provided with a frame and an axle carrying assembly that is controllably and adjustably slidable longitudinally of said frame.

9. The combination of trailers as in claim 1 in which the larger trailer is a boat trailer and the smaller trailer is a camper trailer.

10. The combination of trailers as in claim 1 in which the larger trailer is a house trailer and the smaller trailer is a utility trailer.